United States Patent [19]

Eisenbarth et al.

[11] Patent Number: 5,394,486
[45] Date of Patent: Feb. 28, 1995

[54] METHOD AND APPARATUS FOR MONITORING IMAGE PROCESSING OPERATIONS

[75] Inventors: Christoph Eisenbarth, El Granada; Ira Finkelstein, San Jose; Dennis McGhie, Portola Valley; Edward Panofsky, Woodside, all of Calif.

[73] Assignee: De La Rue Giori S.A., Lausanne, Switzerland

[21] Appl. No.: 268,657

[22] Filed: Jun. 29, 1994

Related U.S. Application Data

[63] Continuation of Ser. No. 926,771, Aug. 6, 1992, abandoned.

[51] Int. Cl.[6] .............................................. G06K 9/00
[52] U.S. Cl. .............................................. 382/57; 382/1; 382/69; 348/192; 348/434; 348/435; 371/24
[58] Field of Search ..................... 382/57, 34, 1, 69; 364/551.01, 474.16, 474.19; 348/177, 181, 192, 434, 435, 466, 476; 371/24, 25.1, 26, 67.1, 68.1, 68.2, 68.3, 69.1, 70, 71, 72, 145

[56] References Cited

U.S. PATENT DOCUMENTS

| Re. 33,462 | 12/1990 | Suzuki et al. | 371/37.5 |
| 4,215,367 | 7/1980 | Schaffer et al. | 348/192 |
| 4,309,767 | 1/1982 | Andow et al. | 371/24 |
| 4,426,698 | 1/1984 | Pargee, Jr. | 371/69.1 |
| 4,554,663 | 11/1985 | Pham van Cang | 348/181 |
| 4,700,222 | 10/1987 | Large et al. | 358/139 |
| 4,709,395 | 11/1987 | Fischer et al. | 382/57 |
| 4,745,476 | 5/1988 | Hirashima | 358/145 |
| 4,794,600 | 12/1988 | Lin | 371/69.1 |
| 4,894,718 | 1/1990 | Hung | 348/181 |
| 4,955,022 | 9/1990 | Odaka | 371/37.4 |
| 5,136,368 | 8/1992 | Fairhurst | 348/177 |
| 5,168,216 | 12/1992 | Dance | 371/25.1 |
| 5,228,042 | 7/1993 | Gauthier et al. | 371/24 |

*Primary Examiner*—Leo H. Boudreau
*Assistant Examiner*—David R. Anderson, Jr.
*Attorney, Agent, or Firm*—Kane, Dalsimer, Sullivan, Kurucz, Levy, Eisele & Richard

[57] ABSTRACT

An image processing system with self monitoring includes an image acquisition module for acquiring data corresponding to an image, and one or more image processing modules. The acquisition module interleaves the variable (and therefore unpredictable) image data with diagnostic data to provide known diagnostic data. The image processing modules process the diagnostic data together with the image data to monitor system performance.

1 Claim, 2 Drawing Sheets

METHOD AND APPARATUS FOR MONITORING IMAGE PROCESSING OPERATIONS

This is a continuation of application(s) Ser. No. 07,926,771, filed on Aug. 6, 1992, now abandoned.

BACKGROUND OF THE INVENTION

1. Field of the Invention

This invention relates to an electronic image processing device which operates continuously and which includes means for monitoring its internal image processing to ensure correct operation. More particularly, the present invention pertains to an apparatus and method wherein diagnostic data is added to a stream of data to provide a criteria for monitoring the operation of various image processor stages.

2. Description of the Prior Art

During the manufacture and off-line testing of image processing devices, repeatable input data can be supplied from a test pattern generator, and subsequent analysis of the processed data can allow evaluation of the image processing function. However, the operation of image processing devices is difficult to monitor on-line because they receive real-time, real world inputs which are not precisely repeatable. Because the inputs are not fixed, analyzing the processed output data from such devices based on the input data does not provide sufficient assurance that the devices are operating properly.

OBJECTIVES AND SUMMARY OF THE INVENTION

An objective of the present invention is to provide a means and method of checking on-line the operation of an image processing apparatus.

A further objective is to provide an image processing apparatus checking means and method by making use of the horizontal blanking times.

Yet a further objective is to provide an image processing apparatus which performs several sequential processing steps on incoming variable data, wherein said apparatus includes means for verifying the operation of the apparatus at each step.

Two dimensional electronic images are traditionally transmitted from point to point in a raster fashion, with formatting information embedded with the image data. The formatting includes a vertical synchronization signal indicating the beginning of a two dimensional frame, and horizontal synchronization signal indicating the beginning of a line. The data for a particular image frame is started with a vertical and horizontal synchronization, and then the data for the first line. Then the horizontal synchronization signal is repeated, followed by the data for the second line. The horizontal synchronization signal and line data are subsequently produced for each line of the rest of the frame. After the end of the last line of the frame, a horizontal and vertical synchronization are again given to indicate the start of the next frame. A time delay is included between the end of the data for a given line and beginning of the data for the subsequent line. This time delay is known as horizontal blanking and is included to allow time for the display and other equipment to complete the processing of one image line and prepare for the next image line. Similarly, an additional time delay may be included between the end of the last image line of a frame and the beginning of the first image line of the next frame. This second time delay is known as vertical blanking and is included to allow time for the display and other equipment to complete the processing of one frame and prepare for the frame.

The horizontal and vertical blanking times in an image communication have been utilized to transfer control and formatting information related to the images. Examples of this are program identification and color correction standards. Unrelated information has been combined with image information to utilize otherwise unused communication bandwidth, for example for the transmission of videotext. In the present invention, the blanking periods are used for the transmission of diagnostic data.

Briefly, the image processing apparatus constructed in accordance with this invention includes means for acquiring or receiving imaging data representative of a variable image and means for generating a known pattern diagnostic data which is interleaved with variable image data. This combined image data is processed within an image processing stage. At the end of the processing step or steps, the processed image data is transmitted to the next processing stage and the processed diagnostic data is fed to a separate diagnostic system and analyzed. The result of this analysis is used to verify that the image processing stage is operating correctly, or if not correct, give some information on incorrect operation allowing rapid correction of the fault. The known diagnostic pattern of data injected into image processor can be varied over time to test the full functionality of the image processor stage. The image data processing apparatus may include several stages for processing the variable image in several steps. In this type of apparatus, the combined image data is processed in multiple steps by the image processing equipment. At each step in the processing, the processed diagnostic data is captured in a separate system and analyzed, as well as being passed on to the next processing stage during the blanking time. The analysis of the diagnostic data captured between each image processing stage is used to verify that the image processing capability of each stage is operating correctly, or if not the fault can be isolated to a single processing stage.

DETAILED DESCRIPTION OF THE INVENTION

Referring now to the Figures, an apparatus 10 constructed in accordance with this invention, includes several modules, such as a data acquisition module 12, and image processing modules 14, 16 and 18. The data acquisition module receives (or generates) image data which may be for example in the form representable on a video screen.

For each image to be represented on a video screen, the data is partitioned into blocks, each block being representative of a horizontal line across the screen.

Several of these lines are assembled on a screen to form a frame.

Figure 1:
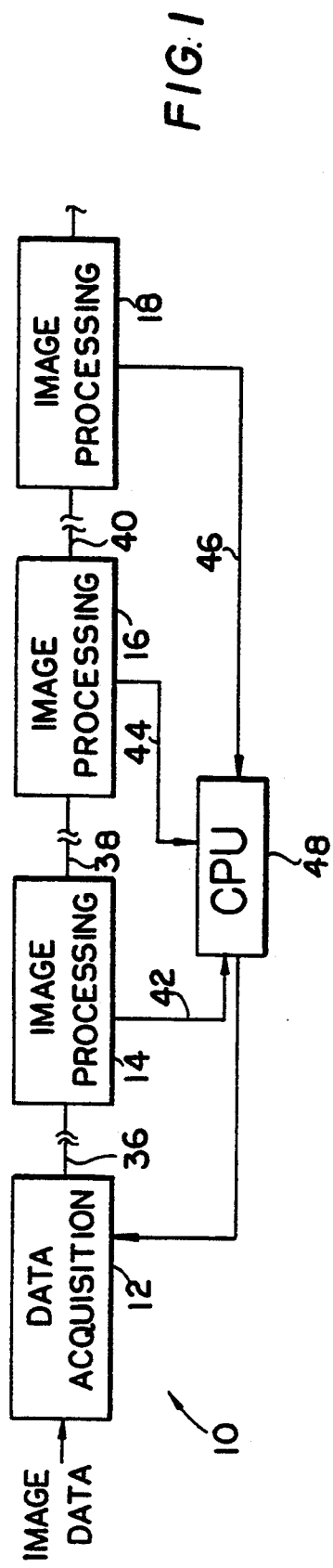
FIG. 1 shows a block diagram for an image processing apparatus constructed in accordance with the present invention.
Figure 2:
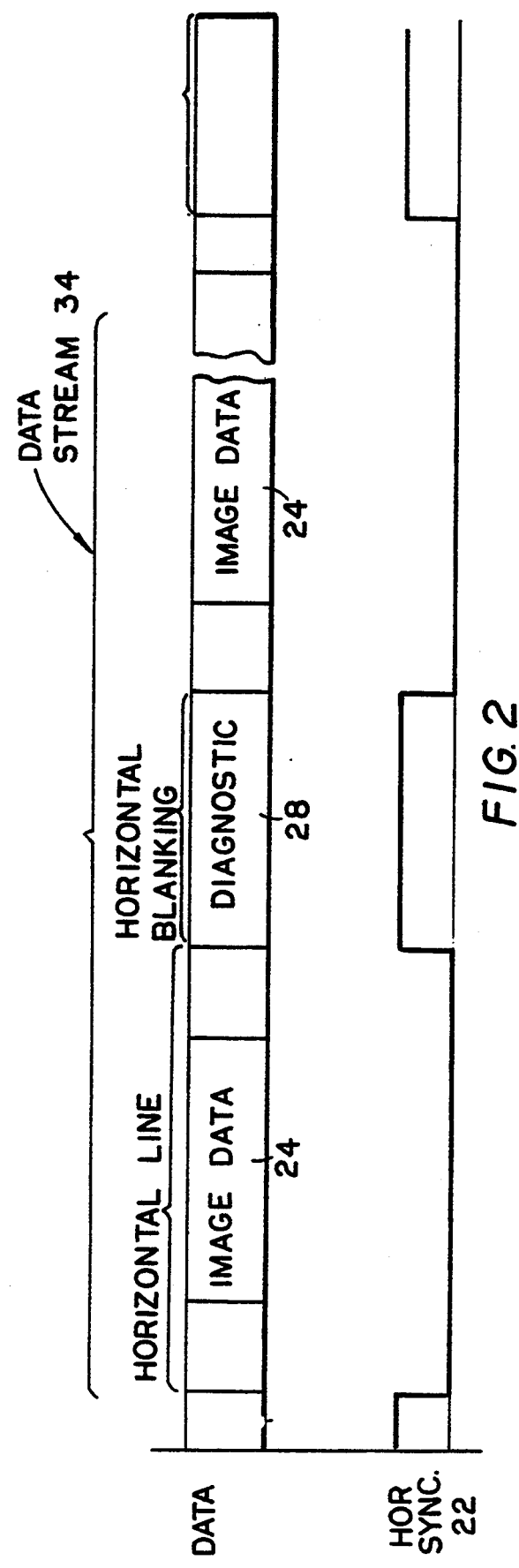
FIG. 2 shows the combined data stream utilized in the apparatus of FIG. 1.

The sequential arrangement of the data blocks is illustrated in FIG. 2. Each frame is started with a vertical sync signal (not shown). The vertical sync signal is followed by the end of a horizontal sync signal 22, indicating the beginning of the image data for the first horizontal line. At the end of image data period 24 there is another horizontal sync signal 26 indicating the beginning of a horizontal blanking period. In the present invention, this horizontal blanking period is used for the transmission of diagnostic data 28. The next horizontal block is again started with the ending of the horizontal sync signal 22 and the processes continues until the frame is completed. The end of the frame is signified by a vertical sync signal (not shown). The composite data stream 34 of FIG. 2 is first generated by the data acquisition module 12 and transmitted over a video channel 36 to the first image processing module 14. The module 14 performs image processing on the composite stream and generates a second data stream for transmission on channel 38 to module 16. The module 16 performs its own processing on the stream received from module 14 and generates another stream for transmission on channel 40 to module 18, and so on. It should be understood that in FIG. 1 a serial arrangement is shown for the various modules, it being understood that one or more modules may also be arranged in parallel to receive and/or transmit a data stream from a common channel.

In addition to the image processing step assigned to them, modules also analyze the data stream received and/or transmitted and generate corresponding diagnostic signals 42, 44, 46. These signals are fed to a CPU 48 for further analysis if required.

Figure 3:
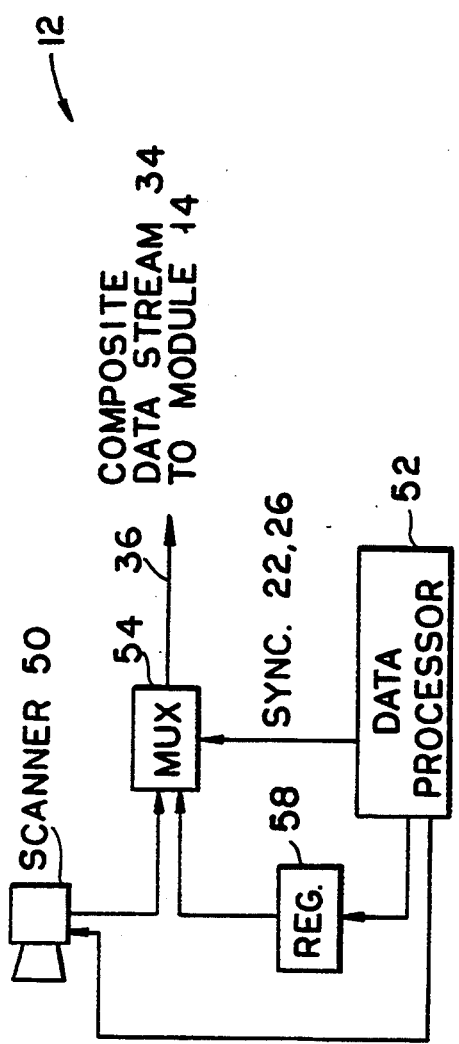
FIG. 3 shows details of a data acquisition module for the apparatus of FIGS. 1 and 3.

As shown in FIG. 3, the data acquisition module 12 could consists of an optical scanner 50 which scans an object (not shown) line by line under the control of a data processor 52. The scanner 50 then produces image data which is fed to a multiplexer (mux) 54. Each data line is preceded by a sync signal 22. The image data for a line is output from the multiplexer on line 36 to the image processing module 14. Module 12 also includes a register 58 which holds fixed diagnostic data from data processor 52 and is coupled to the multiplexer 54. This diagnostic data is transmitted on channel 36 during each sync signal 26. A similar operation occurs at the end of each frame to generate a composite data stream 34 as shown in FIG. 2.

Figure 4:
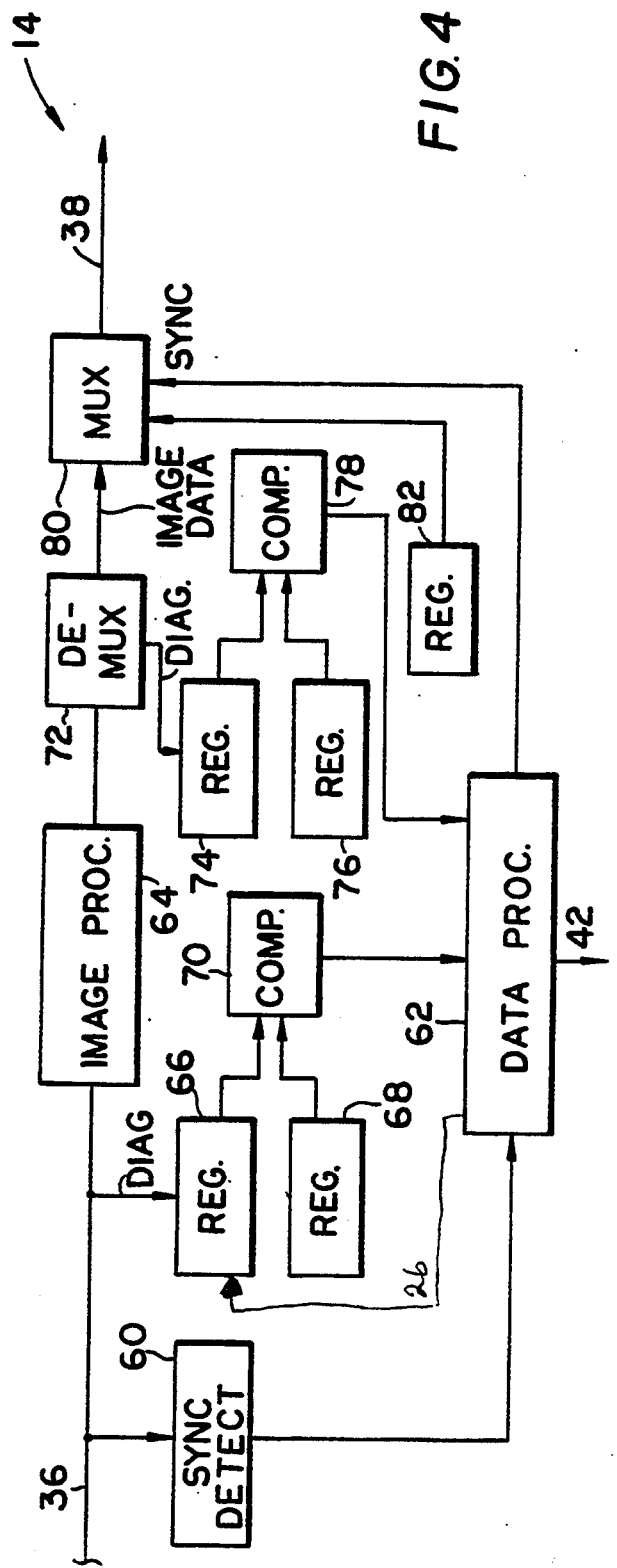
FIG. 4 shows details of an image processing module.

FIG. 4 shows the elements of the image processing module 14. It should be understood that the other modules contain and operate in the same manner except that they may perform a different image processing step on the image data.

Module 14 includes a sync detector circuit 60 which is used to detect the sync signals of the composite data stream 36. When a sync signal is detected by this circuit, a corresponding signal is transmitted to a data processor 62 which operates the various elements of the module. Following the initial sync signal 22, the image data for a line is provided to an image processing stage 64 which performs a preselected image processing step thereon (such as for example multiplication by a constant for amplitude compensation).

Following the line image data is the beginning of sync signal 26 indicating horizontal blanking. During this period the diagnostic data from the composite data stream is fed to a register 66. Another register 68 contains reference signals corresponding to the diagnostic signals. The contents of the two registers 66, 68 are fed to a comparator 70. The comparator compares the contents of the two registers and sends the results of this comparison to processor 62. The processor analyzes this result to determine if the data stream from channel 36 is acceptable or it has been corrupted.

The diagnostic data from channel 36 is also fed to image processor stage 64 which performs the same operation thereon as the operation performed on the line image data. The complete processed data stream is sent to a demultiplexer 72 which separates it into a processed image data stream and a processed diagnostic data stream. The diagnostic data stream is fed to a register 74. Another register 76 contains reference, i.e. data corresponding to the diagnostic data from channel 36 when the image processor stage 64 operates properly. The contents of the two registers 74, 76 are fed to a comparator 78. Comparator 78 compares the contents of the two registers and the results of the comparison are fed to processor 62. Processor 62 analyzes this result to determine of the image processor stage 64 is operating properly. The analysis from comparators 70, 78 are sent to the CPU 48 through line 42.

The processed image data from demultiplexer 72 are fed to a multiplexer 80. The multiplexer 80 receives this image data, the sync signals from processor 42 and new diagnostic data signals from register 82 to assemble a sequential composite image signal on line 38 for the next processor module 16 where the whole process is repeated for its own processing element as well as for channel 38.

In the above embodiment a scanner was used to generate the image data. However, it should be understood that for the purposes of this invention, the image data may be generated by other well known sources, or alternatively it may be received from an external source. Moreover, the functions of various discrete components (such as registers 60, 76, 78 and comparators 70, 78) may be performed by the data processors 62. Similarly, the functions of the data processor 62 may be incorporated into CPU 48. Numerous other modifications may be made to the invention without departing from its scope as defined in the appended claims.

We claim:

1. An image processing system comprising:
    (a) an image acquisition module including
        (i) a source of video image data, said image data being separated into image blocks separated by blanking periods, which image data defines a two dimensional video,
        (ii) an input source of fixed input diagnostic data, and
        (iii) input interleaving means for interleaving diagnostic data between said video image blocks to provide composite input data having an input image component and an input diagnostic component with said input diagnostic component being transmitted during said blanking periods;
    (b) channel means for transmitting said composite input data;
    (c) an image processing module receiving said composite input data from said channel means, and including
        (i) image processing means for processing said composite input data to generate composite processed data having a processed image component and a processed diagnostic component, said composite processed data being defined by processed data blocks separated by said blanking periods to form a two dimensional processed image, with said processed diagnostic component being positioned in said blanking periods, (ii) reference source means for generating a first, a second, and a third reference, said first reference corresponding to said fixed diagnostic data, said second reference corresponding to said processed diagnostic component, and said third reference corresponding to diagnostic data for subsequent processing;

(iii) input comparing means for comparing said first reference to said input diagnostic component and for generating a corresponding first comparator signal;

(iv) processed comparing means for comparing said processed diagnostic component and said second reference to generate a second comparator signal, (v) analyzing means for analyzing said first comparator and said second comparator signals to determine if said image processing means and said channel means are functioning properly, and (vi) output interleaving means for interleaving said third reference and said processed data component to generate an output composite signal.

* * * * *